//  
United States Patent [19]

Dean et al.

[11] 4,049,219

[45] Sept. 20, 1977

[54] VARIABLE PIVOT TRAILING EDGE FLAP

[75] Inventors: Roy Delmar Dean; Richard Herschel Weiland, both of Seattle, Wash.

[73] Assignee: The Boeing Company, Seattle, Wash.

[21] Appl. No.: 671,926

[22] Filed: Mar. 30, 1976

Related U.S. Application Data

[62] Division of Ser. No. 546,578, Feb. 3, 1975, Pat. No. 3,985,319.

[51] Int. Cl.² .............................................. B64C 9/04
[52] U.S. Cl. ................................................... 244/217
[58] Field of Search ........... 244/42 D, 42 DA, 42 DB

[56] References Cited

U.S. PATENT DOCUMENTS

| | | | |
|---|---|---|---|
| 2,137,879 | 11/1938 | Ksoll | 244/42 DB |
| 2,289,704 | 7/1942 | Grant | 244/42 D |

FOREIGN PATENT DOCUMENTS

| | | | |
|---|---|---|---|
| 838,625 | 3/1939 | France | 244/42 DB |

Primary Examiner—Trygve M. Blix
Assistant Examiner—Barry L. Kelmachter
Attorney, Agent, or Firm—Morris A. Case; Bernard A. Donahue

[57] ABSTRACT

A double segmented airplane flap with the main flap movable by a four-bar linkage and the aft flap programmed with a linkage pivotally mounted to wing support structure. The two flap segments are pivotally joined. Linkage programming the aft flap segment is located and sized so that the two flap segments remain in the same relative position as to each other throughout main flap translation, but the aft flap segment may be rotated in either direction at any position by an actuating device.

5 Claims, 15 Drawing Figures

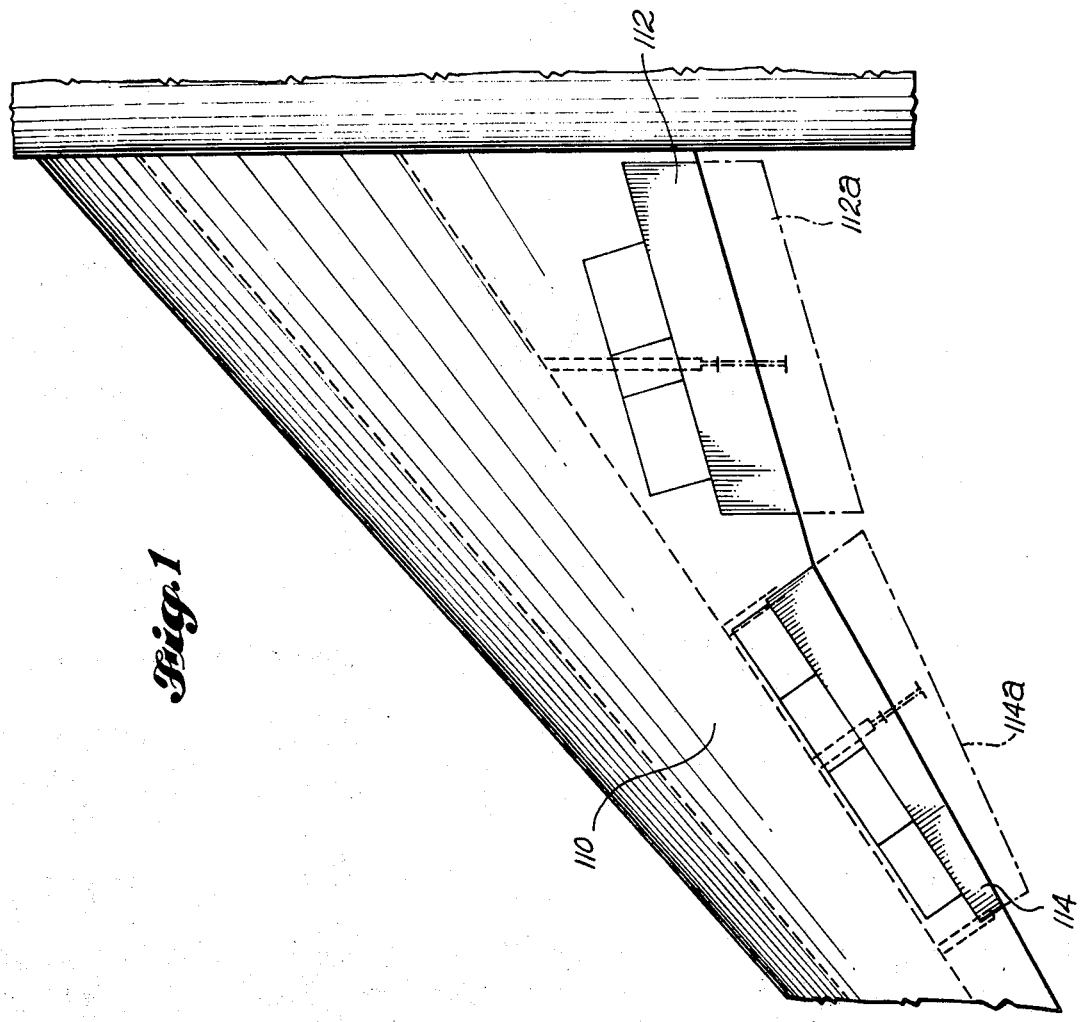

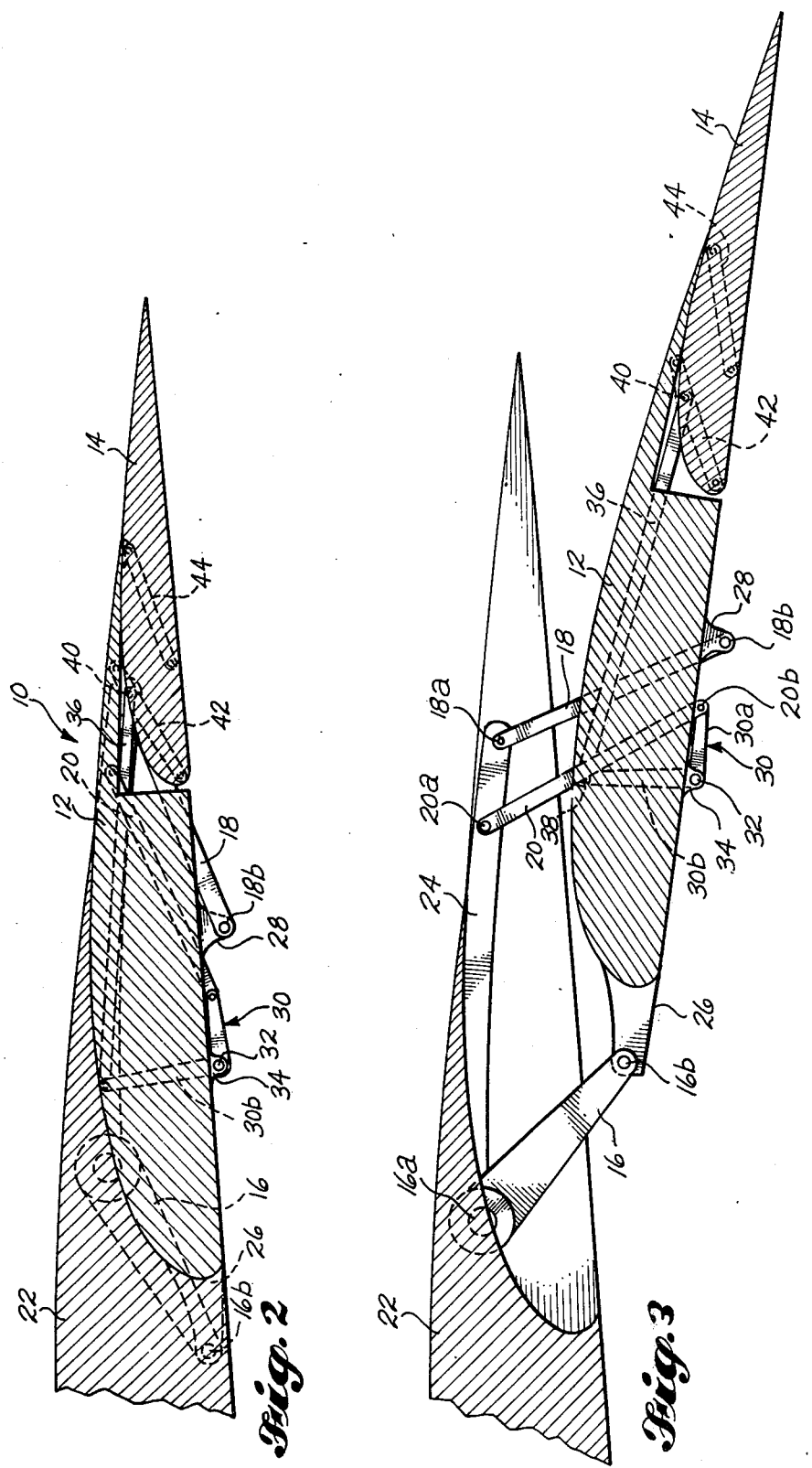

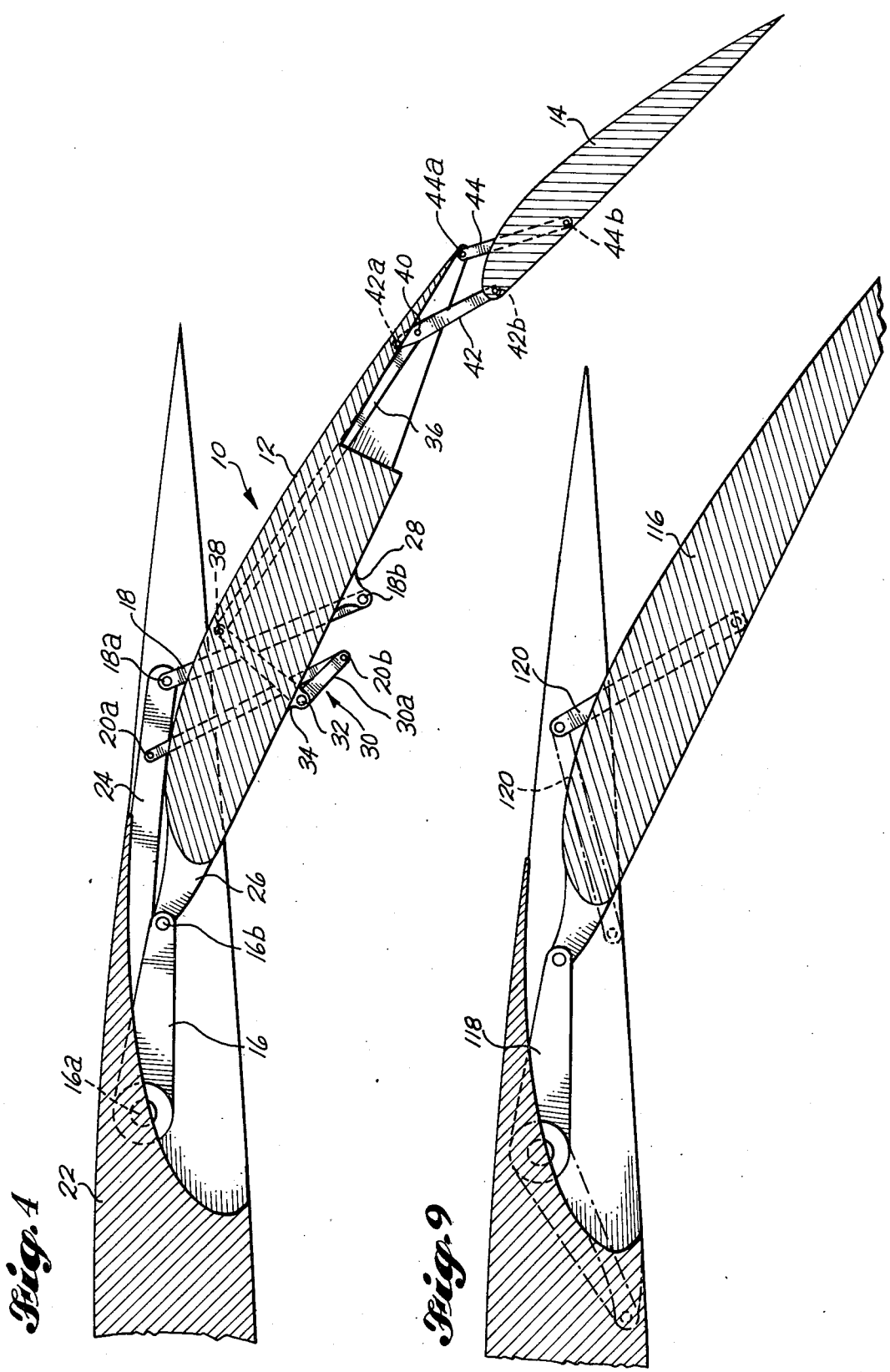

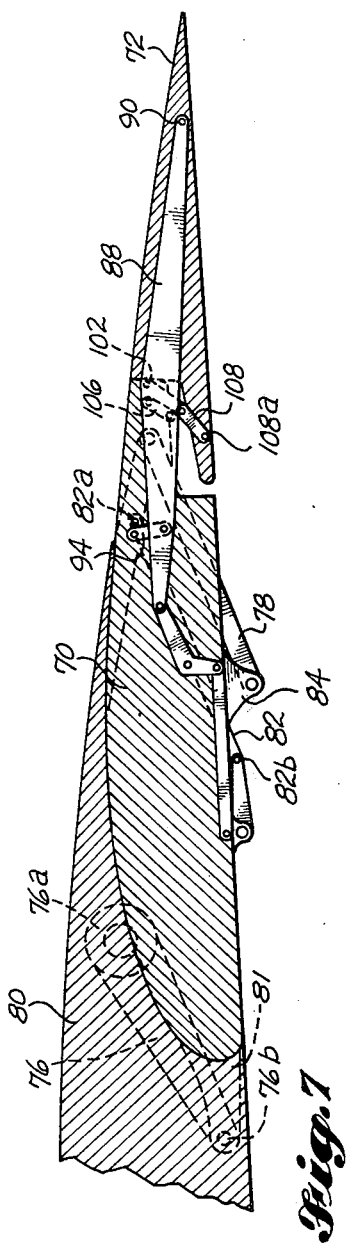
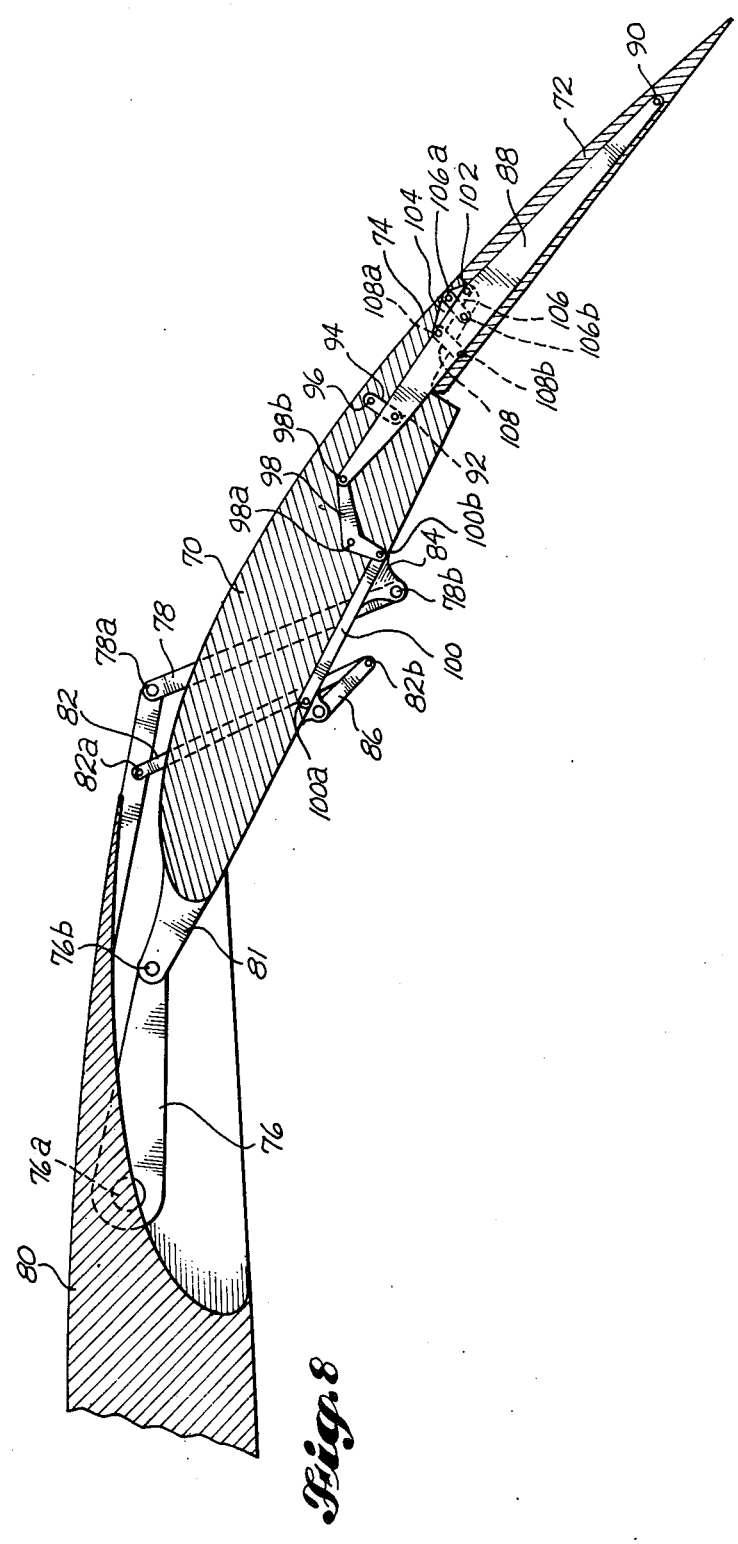

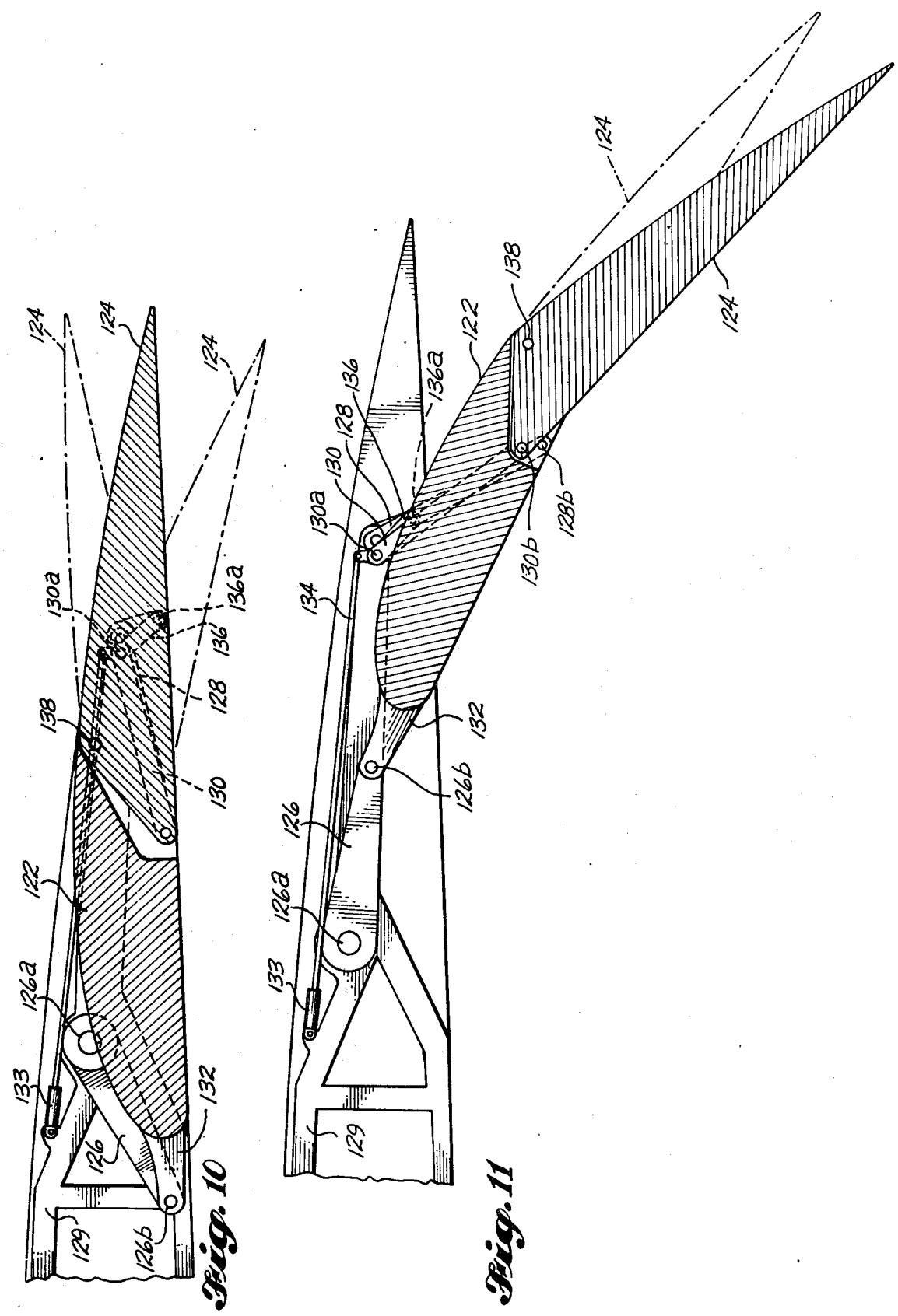

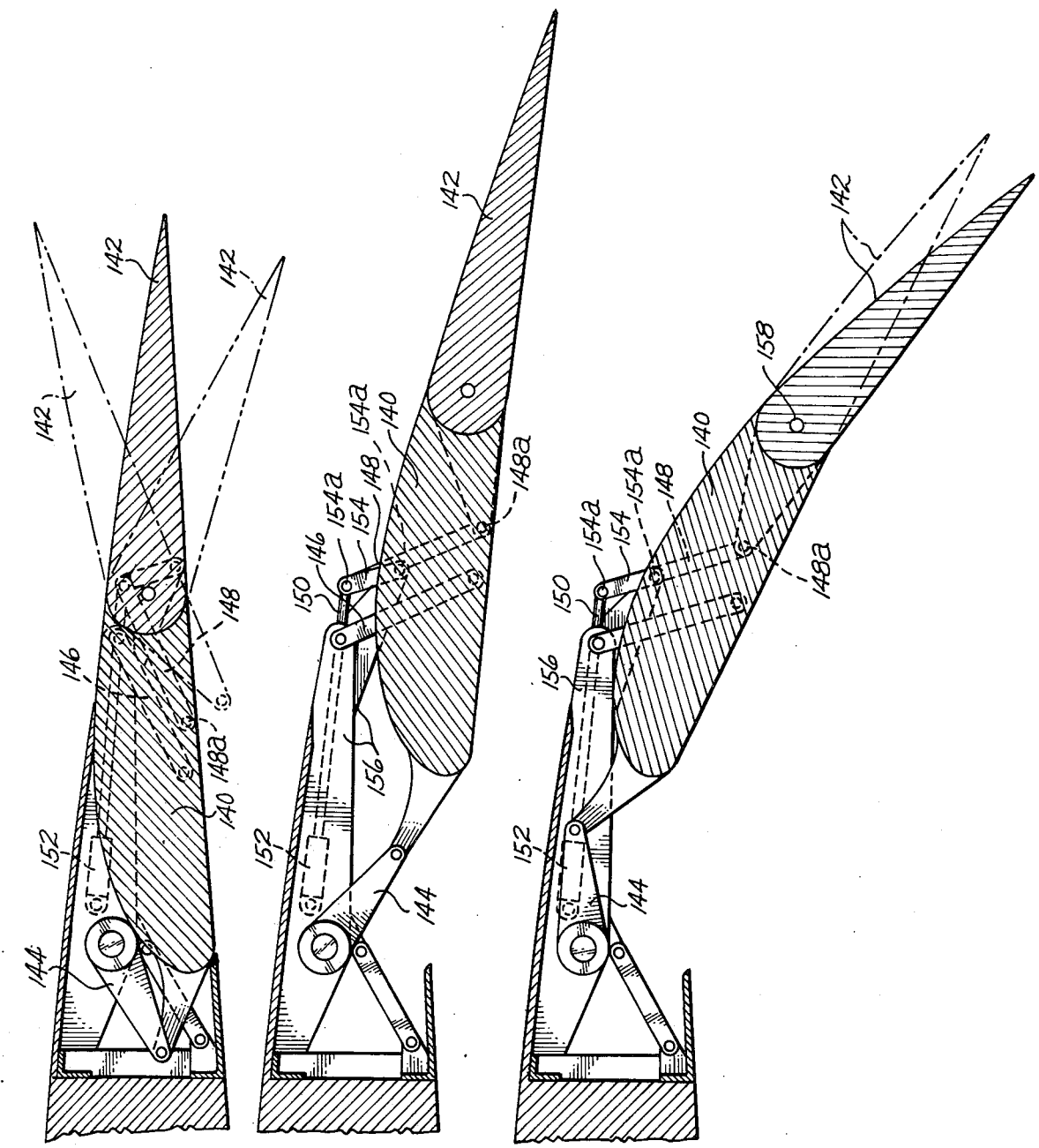

VARIABLE PIVOT TRAILING EDGE FLAP

This is a division, of application Ser. No. 546,578, filed Feb. 3, 1975, and now U.S. Pat. No. 3,985,319.

BACKGROUND OF THE INVENTION

An airplane flap located on the trailing edge of a wing may be translated and rotated to vary wing lift characteristics during various phases of flight. These are various means used to obtain movement of the flap to the desired position. One such method as disclosed in British Pat. No. 558,043 utilizes a four-bar linkage arrangement to move the main flap and a parallel motion device to control an aileron supported at the trailing edge of the flap.

SUMMARY OF THE INVENTION

A two-part or double segment flap is controlled by a four-bar linkage with double links extending from wing support structure to the main flap. A third linkage extends from the wing support structure to an actuating axis point which programs movement of an aft segment of the flap. All the links are pivotally mounted and all converge to a distant point ahead of and below the wing when the flap is nested in the cruise position. The forward bar in the four-bar linkage rotatably is actuated at the upper wing support pivot point to control movement of the flap. The third linkage acts through a bell crank the center pivot point of which is pivotally mounted to the main flap to convert downward movement by the link into rearward movement of a control linkage which programs the relative movement of the aft flap segment with respect to the main flap. As the flap translates into flap take-off position the aft part moves uniformly with the main flap. Upon further travel of the flap into the approach mode the aft flap moves relative to the main flap.

In a variation the third linkage is independently acted upon to impart rotational movement of the aft flap with respect to the main flap in any position of travel of the flaps.

DESCRIPTION OF THE DRAWINGS

FIG. 1 shows a fragmented plan view of an airplane showing the flaps of this invention.

FIGS. 2, 3 and 4 show fragmented side elevational sectional views of the flaps of this invention in various flight positions. FIG. 2 shows the cruise position; FIG. 3 the take-off position; and FIG. 4 the landing approach position.

FIG. 7 shows the cruise position and FIG. 8 the approach position in fragmented side elevational sectional views of a variable camber flap embodying this invention.

FIG. 9 is a fragmented side elevational sectional view of a single segment flap embodying this invention.

FIGS. 10 and 11 show a side elevational sectional view of the cruise and the approach position of a flap with aileron embodying this invention.

FIGS. 12, 13 and 14 show a side elevational sectional view of the cruise, take-off, and approach positions of yet another embodiment of a flap with aileron.

DETAILED DESCRIPTION

Figure 5:
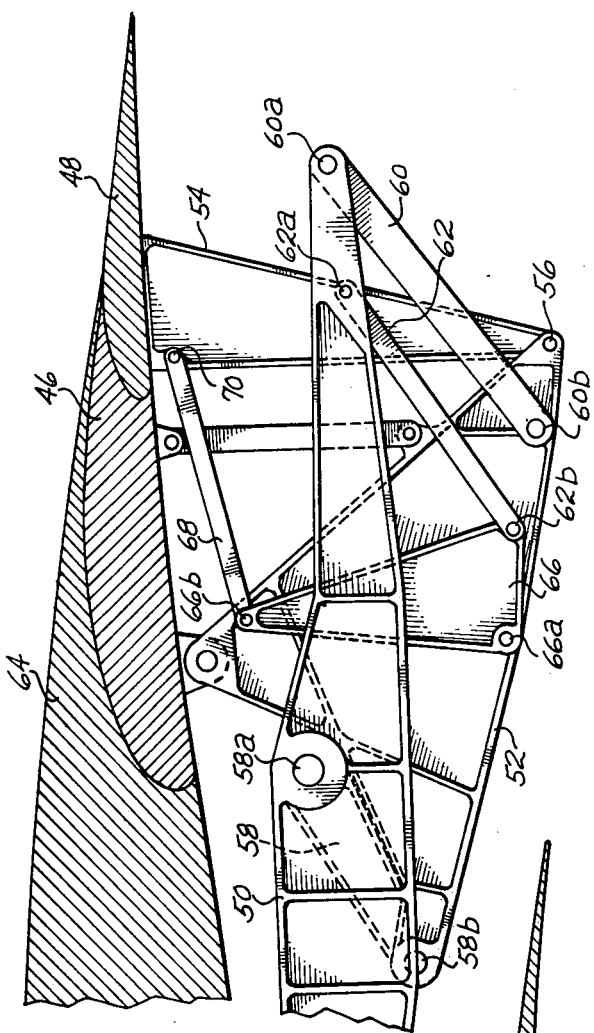
FIG. 5 shows the cruise position and FIG. 6 the landing approach position both in fragmented side elevational section view of a different embodiment.

In a double slotted flap 10, see FIGS. 2, 3 and 4, the flap has leading or main flap 12 and trailing or aft flap 14. A set of three pivotally mounted bars 16, 18, and 20 are aligned to converge at a distant point forward of and below the wing 22 when the flaps are in the cruise position as shown in FIG. 2. The forward bar 16 and the aft bar 18 comprise part of a four-bar linkage to pivotally translate the fore or main flap from cruise, to take-off to landing or approach position and back again as required in operating an aircraft. Fore bar 16 is pivotally mounted at 16a to wing support structure 24 and at 16b to a forwardly extending bracket 26 which in turn is integrally mounted to the main flap 12. Aft bar 18 is pivotally mounted at 18a to wing support structure and at its lower end at 18b to bracket 28 which may extend below the flap as shown or may be within flap contour. This pivotal hinging effects a fourbar linkage with the upper bar the wing support structure, the lower bar the main flap and fore and the aft bar completing the combination. The intermediate bar 20 extends from upper pivot point 20a to an actuation pivot point 20b. This bar connects at the actuation pivot point to leg 30a of bell crank 30 which in turn is pivotally mounted at 32 to the main flap through bracket 34. Linkage 36 extends from, pivot point 38 on the leg 30b of the bell crank to pivot point 40 which is at an intermediate point along linkage 42. This linkage and linkage 44 are pivotally mounted at upper ends to the aft part of the leading flap at pivot points 42a and 44a respectively at the lower ends at pivot points 42b and 44b respectively to leading areas of the trailing flap 14 to form a four-bar linkage to move the aft segment of flap with respect to the fore segment of flap. The flaps may be driven with a linkage connected to fore bar 16, but preferably the flap is driven by rotating a shaft located along the axis of pivot point 16a.

In operation the flaps would be in the nested position for cruise as shown in FIG. 2. When in the nested position bar 16 extends at an acute angle with the horizontal. Thus, movement of the translating linkage first cuases a rapid downward movement of the flap with a wide slot between wing structure and main flap when in the take-off position as shown in FIG. 3. Upon further translation into the landing on approach position, as shown in FIG. 4, the main flap is rotated to narrow the slot between wing structure and main flap and the aft segment of flap is extended to create a slot between flap segments. When the flap is translated out of the cruise position and as it rotates up to about 15° the three pivotally mounted bars 16, 18 and 20 continue to extend to meet at a distant point and the actuation pivot point 20b remains in a constant position with respect to the main flap. Upon further rotation the actuation pivot point moves down with respect to the main flap to program movement of the aft flap by imparting a rearward movement to linkage 36 and extend the flap to the approach position. Upon counterrotation of the flap drive linkage reciprocates back to move the aft flap into the nested position in the main flap. Upon further counterrotation the main flap moves into the nested position with respect to the wing structure.

Figure 6:
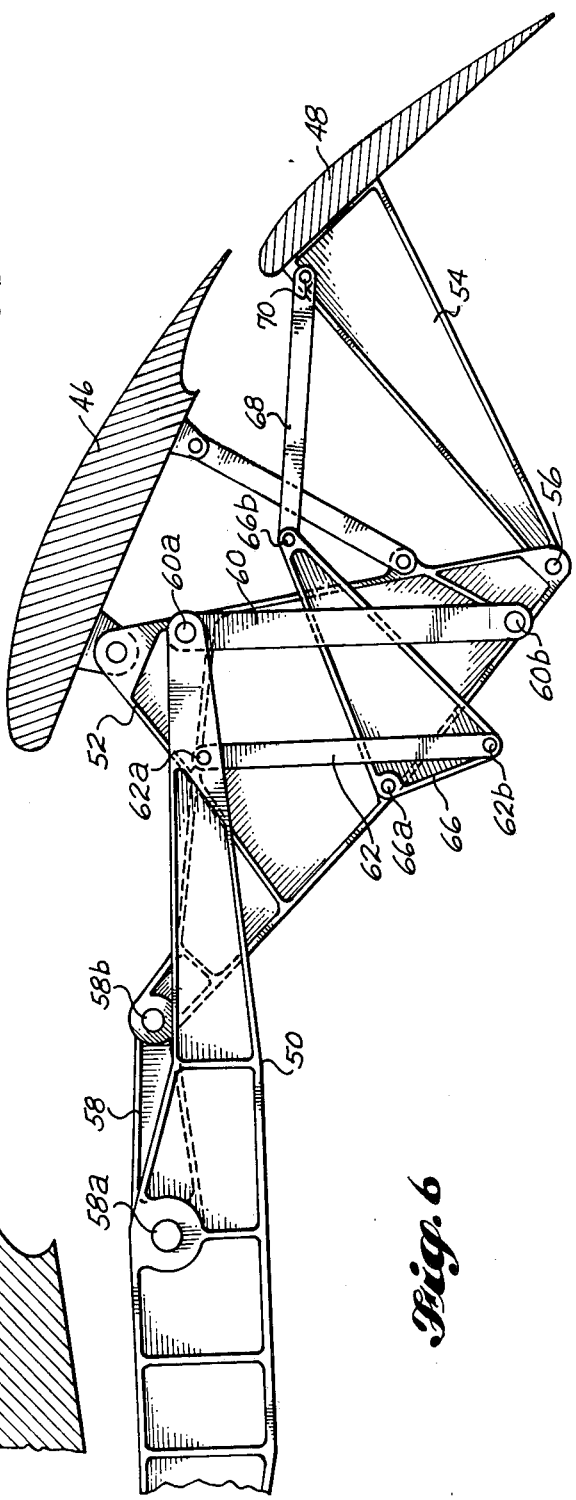

In a different embodiment as shown in FIGS. 5 and 6 a double slotted flap with main flap 46 and trailing or aft flap 48 are supported from structure 50. An extension 52 from the main flap acts like a carriage. Extension 54 from aft flap is pivotally mounted to the aft end of the carriage at 56. A set of three bars 58, 60 and 62 control movement of the carriage and flaps. These bars or linkages extend to a point forward and below the wing 64 when in the flaps are in the cruise position as shown in FIG. 5. The bars pivotally attach at the upper end at 58a, 60a and 62a respectively to the support structure 50. Forward bar 58 and aft bar 60 are pivotally attached at the lower end at 58b and 60b respectively to the carriage to complete a four-bar linkage for translating the flaps. The intermediate bar 62 extends down to an actuation pivot point 62b where the bar is connected to bell crank 66. The bell crank is pivotally connected at its apex 66a to the carriage or flap extension 52, and at 66b linkage 68 which in turn is pivotally connected at 70 near aft flap 48 to the flap extension 54. This linkage acting through the actuation pivot point controls relative movement between the fore and aft flap segments. The two flap segments remain nested until the flaps have been rotated about 15°. Flap support structure and flap extension and drive bars are all outside wing and flap contour.

In yet another embodiment as shown on FIGS. 7 and 8 a variable camber flap with main or leading segment 70 and aft segment 72 has resilient upper panel 74 that flexes due to relative movement between the flap segments to impart variable camber to the flaps. The main flap is pivotally supported with linkages 76 and 78 extending from wing 80 structure at 76a and 78a to main flap brackets 81 and 84 at 76b and 78b respectively. Variable camber is programmed through linkage 82 which is pivotally mounted to wing support structure at 82a and to actuation pivot point at 82b to bell crank 86. All three of the linkages 76, 78 and 82 extend toward a distant point forward and below the wing when in the cruiseposition as shown in FIG. 7. Camber beam 88 extends inside both segments of flaps. The beam is pivotally mounted 90 at the aft end to the aft flap, and near the front of the beam at 92 to a linkage 94 which is mounted to the main flap at 96. The beam pivots about point 92 in response to rotational force from bell crank 98 which in turn is acted on through linkage 100. This linkage is connected at 100a to bell crank 86 and at 100b to bell crank 98. Bell crank 98 is mounted to main flap 70 at 98a and to the beam 88 at 98b. The beam is pivotally mounted at 102 its upper middle to linkage 104, which in turn is connected to main flap 70 through linkage 106 at pivot points 106a and 106b, and to aft flap 72 through linkage 108 at pivot points 108a and 108b. When the flap moves to the extended position for the approach mode as shown in FIG. 8 downward movement of actuation pivot point 82b rotates the beam downward around pivot point 92 which rotates the aft flap downward at its trailing edge and cambers the flexible upper panel 74.

FIG. 1 shows a plan view of an airplane wing 110 with inboard flaps 112 and outboard flaps 114. The inboard flaps in operation extend streamwise as shown in phantom at 112a, and the outboard flaps extend chordwise as is shown at 114a and both flaps are driven with the same system as disclosed in this invention.

FIG. 9 shows a single flap 116 translated with a pair of bars 118 and 120. In FIGS. 10 and 11 a two segmented flap has main flap segment 122 and an aileron segment 124. The main flap segment is translated with a four-bar linkage having forward bar 126 and aft bar 128 pivotally supported above to the wing structure 129 at 126a and 128a respectively. Bar 126 is pivotally mounted at 126b at its lower end to bracket 132 which is integral with main flap 122, and bar 128 is pivotally mounted at its lower end to the main flap at 128b. These bars are positioned to extend to a distant point forward and below the wing when in the cruise position as shown in FIG. 9. A third bar 130 is positioned to have identical pivot axes with aft bar 128 at all positions of the main flap unless and until a separate force is exerted on the link or bar 130. This force may be introduced in any conventional manner. In this embodiment actuating cylinder 133 with cylinder rod 134 is pivotally connected at 130a on actuation pivot point to the bar. A fourth bar 136 is simultaneously pivotally connected at axis 130a and its other end is connected to wing structure at 136a. The lower end of the bar 130 is pivotally connected at 130b. The main flap and the aileron are pivotally connected at 138. In operation the two segments of flap will maintain relative positions throughout flap translations, but the aileron may be rotated in either direction with respect to the main flap at any main flap position by forward or reverse movement of the actuating cylinder.

In FIGS. 12 through 14 yet another embodiment of a two segmented flap with aileron is shown with main flap 140 and aileron segment 142. The flap is supported for translation with a four-bar linkage with fore and aft bars 144 and 146 that extend to a distant point below the wing as in the other embodiments. A third bar 148 with identical distance between axes as the aft bar 146 is located adjacent and parallel to the aft bar at all positions of the main flap unless and until a force is exerted at actuation pivot point 148a through rod 150 from actuating cylinder 152. Bar 148 is also pivotally connected at 148a to linkage 154 which is pivotally connected at 154a to wing support structure 156. The other end of bar 148 is pivotally connected at 148b to the aft flap or aileron. The two flap segments are pivotally joined at 158. In operation the two flap segments remain in the same relative position with regard to each other throughout main flap translation, but the aileron may be rotated in either direction at any position by action through the actuation cylinder.

What is claimed is:

1. In an airplane wing having a double variable flap comprising: a flap having two parts comprising leading and trailing parts capable of movement with respect to each other, a four-bar linkage with a fore and an aft bar extending from wing support structure to the leading part of the flap, a pivotable linkage extending from the wing support structure to an actuation pivot point, and means for imparting relative movement between the leading and trailing parts of the flap through the actuation pivot point wherein the means for imparting relative movement comprises: a pivotable connection between the two parts of the flap, a linkage extending from the trailing part of the flap to the actuation pivot point having an axis for rotation at each end of the linkage identical to the axis for rotation at each end of the aft bar when the two parts of the flap are in cruise position, and means for imparting motion through the actuation pivot point.

2. In an airplane wing having a double variable flap comprising: a flap having two parts comprising leading and trailing parts capable of movement with respect to each other, a four-bar linkage with a fore and an aft bar extending from wing support structure to the leading part of the flap, a pivotable linkage extending from the wing support structure to an actuation pivot point, and means for imparting relative movement between the leading and trailing parts of the flap through the actuation pivot point wherein the means for imparting relative movement comprises: a pivotal connection between the two parts of the flap, a linkage extending from the trailing part of the flap to the actuation pivot point said linkage adjacent, parallel and of identical length to the aft bar when the flaps are in the cruise position, and means for imparting motion through the actuation pivot point.

3. An airplane wing having a two segment flap comprising: a main flap segment; an aft flap segment; a four-bar linkage with a pair of pivotable links comprising a forward link and an aft link extending from a wing support structure to the main flap segment, said links aligned to converge at a distant point forward of and below the wing; a third pivotable link identical in pivot axis to the aft link in the pair of pivotable links with the flap in cruise position, said third pivotable link pivotally mounted to the aft flap segment at one end and to an actuation pivot point at the other end; a fourth pivotable link extending from wing support structure to the actuation point; a pivotable mounting between the main and the aft flap segments; and means for imparting movement to the actuation pivot point to rotate the aft flap segment with respect to the main flap segment at any position of the main flap segment.

4. An airplane wing having a flap comprising: a four-bar linkage with a fore and an aft bar each pivotally mounted to extend from wing support structure to a flap, means for driving the fore bar to translate the flap from cruise through take-off and landing positions, an aft segment of flap pivotally joined to a main segment of flap, a third and pivotally mounted bar extending from the aft flap segment to an actuation axis, a fourth pivotally mounted bar to extend from wing structure to the third bar at the actuation axis, means for imparting movement through the actuation axis to rotate the aft flap segment, and with the third bar having identical pivoting axes with the aft bar in all positions of the main flap segment to maintain relative position between the flap segments during main flap movement and to allow rotation of the aft flap in any main flap position by movement through the actuation axis.

5. An airplane wing having a flap comprising: a four-bar linkage with a fore and an aft bar each pivotally mounted to extend from wing support structure to a flap, means for driving the fore bar to translate the flap from cruise through take-off and landing positions, an aft segment of flap pivotally joined to a main segment of flap, a third and pivotally mounted bar extending from the aft flap segment to an actuation axis, a fourth pivotally mounted bar to extend from wing structure to the third bar at the actuation axis, means for imparting movement through the actuation axis to rotate the aft flap segment, and with the third bar located adjacent, parallel and of identical length to the aft bar to maintain position between the flap segments during main flap movement and to allow rotation of the aft flap in any main flap position by movement through the actuation axis.

* * * * *